US008441790B2

(12) United States Patent
Pance et al.

(10) Patent No.: US 8,441,790 B2
(45) Date of Patent: May 14, 2013

(54) ELECTRONIC DEVICE HOUSING AS ACOUSTIC INPUT DEVICE

(75) Inventors: Aleksandar Pance, Saratoga, CA (US); Nicholas Vincent King, San Jose, CA (US); Duncan Kerr, San Francisco, CA (US); Brett Bilbrey, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 748 days.

(21) Appl. No.: 12/542,386

(22) Filed: Aug. 17, 2009

(65) Prior Publication Data

US 2011/0037734 A1    Feb. 17, 2011

(51) Int. Cl.
| | |
|---|---|
| *G06F 1/16* | (2006.01) |
| *H05K 5/00* | (2006.01) |
| *H05K 7/00* | (2006.01) |
| *G06T 17/00* | (2006.01) |

(52) U.S. Cl.
USPC ..................... 361/679.55; 345/424

(58) Field of Classification Search ............. 361/679.02, 361/679.09, 679.18, 679.55; 345/173, 182, 345/424; 702/54, 71
See application file for complete search history.

(56) References Cited

U.S. PATENT DOCUMENTS

| | | | | |
|---|---|---|---|---|
| 3,883,861 | A | * | 5/1975 | Heartz ............... 345/9 |
| 4,066,855 | A | | 1/1978 | Zenk |
| 4,085,302 | A | | 4/1978 | Zenk et al. |
| 4,369,439 | A | * | 1/1983 | Broos ............ 345/164 |
| 4,506,354 | A | * | 3/1985 | Hansen .......... 367/101 |
| 5,059,959 | A | * | 10/1991 | Barry .............. 345/168 |
| 5,317,105 | A | | 5/1994 | Weber |
| 5,342,991 | A | | 8/1994 | Xu et al. |
| 5,483,261 | A | | 1/1996 | Yasutake |
| 5,488,204 | A | | 1/1996 | Mead et al. |
| 5,770,898 | A | | 6/1998 | Hannigan et al. |
| 5,825,352 | A | | 10/1998 | Bisset et al. |
| 5,835,079 | A | | 11/1998 | Shieh |
| 5,880,411 | A | | 3/1999 | Gillespie et al. |
| 5,959,612 | A | | 9/1999 | Breyer et al. |

(Continued)

FOREIGN PATENT DOCUMENTS

| | | |
|---|---|---|
| CN | 201898231 | 7/2011 |
| EP | 1827057 | 8/2007 |

(Continued)

OTHER PUBLICATIONS

Kwon et al., "Haptic Interferences for Mobile Devices: a Survey of the State of the Art," Telerobotics and Control Laboratory, KAIST (Korea Advanced Institute of Science and Technology, Korea, Dec. 11, 2007.

(Continued)

*Primary Examiner* — Adrian S Wilson
(74) *Attorney, Agent, or Firm* — David C. Kellogg

(57) ABSTRACT

There are provided systems, devices and methods for related to an electronic device housing having input functionality. Specifically, in one embodiment, the electronic device includes a housing and one or more acoustic transducers positioned within the housing each operative to generate an electrical signal in response to detecting a sound resulting from an impact with the housing. Additionally, the electronic device includes a microprocessor coupled to the one or more acoustic transducers and configured to receive the electrical signals generated by the one or more acoustic transducers. The microprocessor operative to interpret the generated electrical signals as input to the electronic device.

17 Claims, 5 Drawing Sheets

U.S. PATENT DOCUMENTS

| | | | |
|---|---|---|---|
| 5,975,953 A | 11/1999 | Peterson | |
| 6,067,074 A | 5/2000 | Lueders | |
| 6,130,663 A * | 10/2000 | Null | 345/158 |
| 6,188,391 B1 | 2/2001 | Seely et al. | |
| 6,198,470 B1 * | 3/2001 | Agam et al. | 345/157 |
| 6,310,610 B1 | 10/2001 | Beaton et al. | |
| 6,313,825 B1 * | 11/2001 | Gilbert | 345/156 |
| 6,323,846 B1 | 11/2001 | Westerman et al. | |
| 6,337,678 B1 | 1/2002 | Fish | |
| 6,429,846 B2 | 8/2002 | Rosenberg et al. | |
| 6,690,387 B2 | 2/2004 | Zimmerman et al. | |
| 6,713,672 B1 | 3/2004 | Stickney | |
| 6,800,805 B2 | 10/2004 | Deguchi | |
| 6,803,245 B2 | 10/2004 | Auch et al. | |
| 6,879,319 B2 | 4/2005 | Cok | |
| 6,987,466 B1 | 1/2006 | Welch et al. | |
| 7,015,894 B2 | 3/2006 | Morohoshi | |
| 7,034,913 B2 | 4/2006 | Ishida | |
| 7,075,793 B2 | 7/2006 | Le et al. | |
| 7,113,196 B2 | 9/2006 | Kerr | |
| 7,125,287 B1 | 10/2006 | Chou et al. | |
| 7,184,064 B2 | 2/2007 | Zimmerman et al. | |
| 7,188,989 B2 | 3/2007 | Miyashita | |
| 7,324,093 B1 | 1/2008 | Gettemy et al. | |
| 7,345,677 B2 * | 3/2008 | Ing et al. | 345/173 |
| 7,411,581 B2 * | 8/2008 | Hardie-Bick | 345/173 |
| 7,470,866 B2 | 12/2008 | Dietrich et al. | |
| 7,473,139 B2 | 1/2009 | Barringer et al. | |
| 7,511,711 B2 * | 3/2009 | Ing et al. | 345/424 |
| 7,541,671 B2 | 6/2009 | Foust et al. | |
| 7,575,481 B1 | 8/2009 | Liu | |
| 7,620,316 B2 | 11/2009 | Boillot | |
| 7,656,393 B2 * | 2/2010 | King et al. | 345/173 |
| 7,663,607 B2 | 2/2010 | Hotelling et al. | |
| 7,710,397 B2 | 5/2010 | Krah et al. | |
| 7,714,801 B2 | 5/2010 | Kimmel | |
| 7,725,288 B2 * | 5/2010 | Boillot | 702/159 |
| 7,834,451 B2 | 11/2010 | Lee et al. | |
| 7,834,855 B2 * | 11/2010 | Hotelling et al. | 345/173 |
| 7,844,310 B2 | 11/2010 | Anderson | |
| RE42,199 E | 3/2011 | Caldwell | |
| 7,920,223 B2 | 4/2011 | Nishizawa et al. | |
| 8,068,635 B2 | 11/2011 | Carlson et al. | |
| 8,098,233 B2 * | 1/2012 | Hotelling et al. | 345/173 |
| 8,189,851 B2 | 5/2012 | Booth et al. | |
| 2004/0001137 A1 * | 1/2004 | Cutler et al. | 348/14.08 |
| 2004/0238195 A1 | 12/2004 | Thompson | |
| 2005/0212777 A1 * | 9/2005 | Ing et al. | 345/173 |
| 2005/0226455 A1 | 10/2005 | Aubauer et al. | |
| 2006/0026521 A1 | 2/2006 | Hotelling et al. | |
| 2006/0042820 A1 | 3/2006 | Lin et al. | |
| 2006/0044259 A1 * | 3/2006 | Hotelling et al. | 345/156 |
| 2006/0132025 A1 | 6/2006 | Gao et al. | |
| 2006/0197753 A1 | 9/2006 | Hotelling | |
| 2007/0182722 A1 * | 8/2007 | Hotelling et al. | 345/173 |
| 2008/0084404 A1 * | 4/2008 | Andre et al. | 345/204 |
| 2008/0103637 A1 | 5/2008 | Bliven et al. | |
| 2008/0238725 A1 * | 10/2008 | Gitzinger et al. | 341/22 |
| 2009/0002328 A1 | 1/2009 | Ullrich et al. | |
| 2009/0015747 A1 | 1/2009 | Nishizawa et al. | |
| 2009/0052715 A1 * | 2/2009 | Zhang et al. | 381/365 |
| 2009/0082103 A1 | 3/2009 | Lube | |
| 2009/0097691 A1 | 4/2009 | Eaton | |
| 2009/0161048 A1 | 6/2009 | Satake et al. | |
| 2009/0167171 A1 | 7/2009 | Jung et al. | |
| 2009/0173533 A1 | 7/2009 | Brock et al. | |
| 2009/0173534 A1 | 7/2009 | Keiper et al. | |
| 2009/0176391 A1 | 7/2009 | Brock et al. | |
| 2009/0201443 A1 | 8/2009 | Sasaki et al. | |
| 2009/0244836 A1 | 10/2009 | Leng et al. | |
| 2009/0256471 A1 | 10/2009 | Kim et al. | |
| 2010/0006845 A1 | 1/2010 | Seo et al. | |
| 2010/0026952 A1 | 2/2010 | Miura et al. | |
| 2010/0044067 A1 | 2/2010 | Wong et al. | |
| 2010/0045705 A1 | 2/2010 | Vertegaal et al. | |
| 2010/0052521 A1 | 3/2010 | Kim et al. | |
| 2010/0110041 A1 | 5/2010 | Jang | |
| 2010/0122439 A1 | 5/2010 | Britton et al. | |
| 2010/0238367 A1 | 9/2010 | Montgomery et al. | |
| 2010/0238612 A1 | 9/2010 | Hsiao et al. | |
| 2010/0265187 A1 | 10/2010 | Chang et al. | |
| 2010/0301755 A1 | 12/2010 | Pance et al. | |
| 2010/0306683 A1 | 12/2010 | Pance et al. | |
| 2010/0315399 A1 | 12/2010 | Jacobson et al. | |
| 2011/0037624 A1 | 2/2011 | Pance et al. | |
| 2011/0037734 A1 | 2/2011 | Pance et al. | |
| 2011/0038114 A1 * | 2/2011 | Pance et al. | 361/679.4 |
| 2011/0043227 A1 | 2/2011 | Pance et al. | |
| 2011/0086680 A1 | 4/2011 | Kim et al. | |
| 2011/0119973 A1 | 5/2011 | Andre et al. | |
| 2011/0175813 A1 * | 7/2011 | Sarwar et al. | 345/168 |
| 2012/0111479 A1 | 5/2012 | Sung et al. | |
| 2012/0127087 A1 | 5/2012 | Ma | |
| 2012/0211148 A1 | 8/2012 | Sung et al. | |
| 2012/0218219 A1 | 8/2012 | Rappoport et al. | |

FOREIGN PATENT DOCUMENTS

| | | |
|---|---|---|
| EP | 2202624 | 6/2010 |
| JP | 58112263 | 7/1983 |
| JP | 20000163031 | 6/2000 |
| JP | 2002342033 | 11/2002 |
| WO | 0174114 | 10/2001 |
| WO | 02095342 | 11/2002 |
| WO | WO2005/083547 | 9/2005 |
| WO | 2007082114 | 7/2007 |
| WO | WO2007/083894 | 7/2007 |

OTHER PUBLICATIONS

Chen et al., U.S. Appl. No. 13/186,238, filed Jul. 19, 2011.
Drzaic et al., U.S. Appl. No. 13/252,971, filed Oct. 4, 2011.
Franklin et al., U.S. Appl. No. 13/250,227, filed Sep. 30, 2011.
Franklin et al., U.S. Appl. No. 13/250,666, filed Sep. 30, 2011.
Franklin et al., U.S. Appl. No. 13/310,409, filed Dec. 2, 2011.
Franklin et al., U.S. Appl. No. 13/422,724, filed Mar. 16, 2012.
Lynch, U.S. Appl. No. 13/184,303, filed Jul. 15, 2011.
Martisauskas et al., U.S. Appl. No. 13/229,120, filed Sep. 9, 2011.
Myers et al., U.S. Appl. No. 13/108,256, filed May 16, 2011.
Myers et al., U.S. Appl. No. 13/246,510, filed Sep. 27, 2011.
Raff et al., U.S. Appl. No. 13/452,061, filed Apr. 20, 2012.
Rappoport et al., U.S. Appl. No. 13/249,734, filed Sep. 30, 2011.
Rappoport et al., U.S. Appl. No. 13/273,851, filed Oct. 14, 2011.
Rothkopf et al., U.S. Appl. No. 13/177,165, filed Jul. 6, 2011.
Takamatsu et al., "Transparent conductive-polymer strain sensors for touch input sheets of flexible displays" Journal of Micromechanics and Microengineering, J. Micromech. Microeng. 20 (2010) 075017 (6pp).
Bhattacharya et al., "Organic LED Pixel Array on a Dome" The IEEE, vol. 93, No. 7, Jul. 2005.
Stedmon et al., "Sound and Tangible Interfaces for Novel product design" Satin, Nov. 2007.
Wagner et al., "Flexible thin-film transistor backplanes" Department of Electrical Engineering, and Princeton Institute for the Science and Technology of Materials.
Sugimoto et al., "Loudspeakers for flexible displays," Acoust. Sci. & Tech., Japan, Jan. 12, 2012, vol. 30, 2, (pp. 151-153).

* cited by examiner

ELECTRONIC DEVICE HOUSING AS ACOUSTIC INPUT DEVICE

CROSS-REFERENCE TO RELATED APPLICATIONS

The following related applications are hereby incorporated by reference in their entirety and for all purposes: "Sensing Capacitance Changes of a Housing of an Electronic Device," Ser. No. 12/542,354 and "Housing as an I/O Device," Ser. No. 12/542,471. Both were filed on the same day as the instant application.

BACKGROUND

I. Technical Field

The present invention relates generally to acoustic sensors and, more particularly, to implementing acoustic sensors that use a surface of an electronic device housing as an input.

II. Background Discussion

Computing devices such as desktop computers, notebook computers, personal digital assistants, cell phones, smart phones and mobile media devices may be found in all aspects of today's society. They serve as work tools, communication devices and provide entertainment, among other things. Users generally interact with electronic devices using discrete input/output (I/O) devices such as a keyboard, a trackpadg, a mouse, a camera, a monitor, a printer, and so forth.

SUMMARY

Certain embodiments may take the form of housings for electronic devices with integrated acoustic transducers to allow the housing to operate as an input, while other embodiments may be related methods for operation of the housing. For example, in one embodiment, the electronic device includes a housing and one or more acoustic transducers positioned within the housing each operative to generate an electrical signal in response to detecting a sound resulting from an impact with the housing. Additionally, the electronic device includes a microprocessor coupled to the one or more acoustic transducers and configured to receive the electrical signals generated by the one or more acoustic transducers. The microprocessor operative to interpret the generated electrical signals as input to the electronic device.

Another embodiment takes the form of a method of manufacturing an electronic device implementing acoustic transducers within a housing of the electronic device to sense input via the housing. The method may include configuring one or more acoustic transducers located within a housing to sense sound originating on the housing and coupling the one or more acoustic transducers to a microprocessor. The microprocessor may be programmed to interpret electrical signals generated by the one or more acoustic transducers as input, wherein the interpretation includes determining the origin of acoustic interactions based on a timing differential between the generated electrical signals.

Yet another embodiment may take the form of or include an electronic device having a panel having an external surface and an internal surface and a plurality of acoustic transducers positioned in the housing proximate to the internal surface. The plurality of acoustic transducers may be distributed under the panel in a predetermined configuration and configured to generate electrical signals based on interactions of the external surface. The electronic device may also include a microprocessor coupled to the plurality of acoustic transducers and configured to interpret the electrical signals as input to the device. Additionally, the electronic device may include one or more output devices configured to provide an output in response to the input.

DETAILED DESCRIPTION

Figure 1:
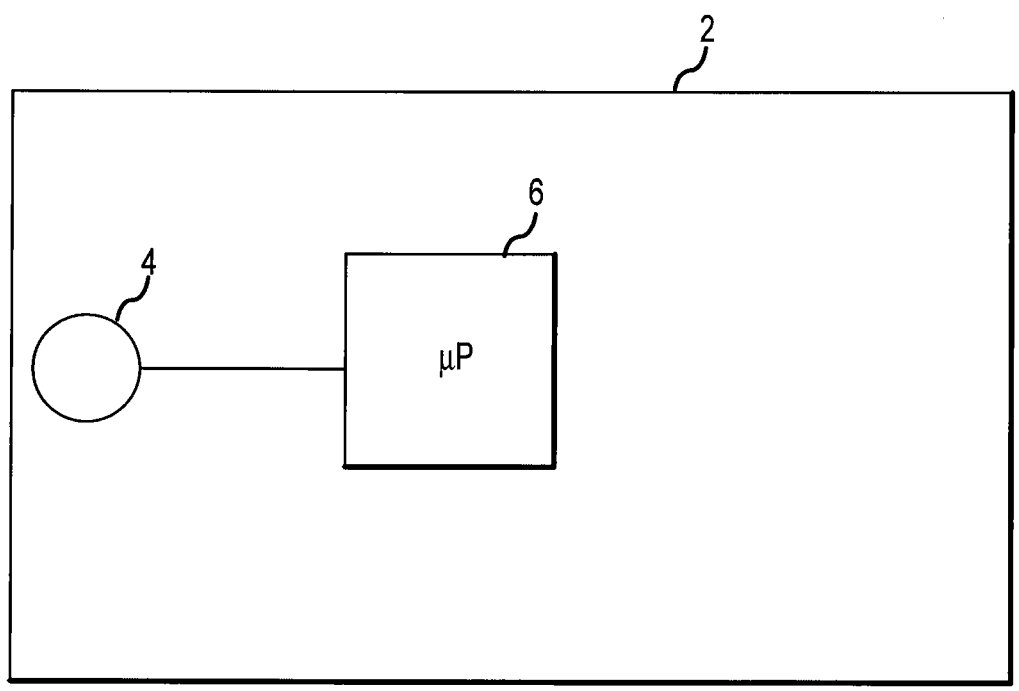
FIG. 1 is a simplified block diagram of a device housing configured to function as an acoustic input device.

FIG. 1 is a simplified block diagram illustrating a housing 2 of an electronic device configured to function as an acoustic input device. The housing 2 includes an acoustic transducer 4 that converts acoustic input of the housing 2 to an electronic signal that may be processed. Only a single acoustic transducer 4 is illustrated, however, as discussed in greater detail below and as should be understood, any number of acoustic transducers, such as N acoustic transducers, may be implemented in specific embodiments. The acoustic transducer 4 may be coupled directly to the housing or may otherwise be in physical contact with the housing 2 in some embodiments. As such, the transducer 4 may sense interactions of the housing 2 and generate a corresponding electrical signal. Specifically, the transducer 4 may sense acoustic waveforms traveling through the housing 2 and generate a corresponding signal. In other embodiments, the transducer may not be coupled to the housing 2 and may sense the acoustic waveforms through a medium other than the housing 2 (such as through the air). The acoustic transducer 4 may be a microphone or other suitable device and can be used for acoustic tracking, gesture detection, and so on.

Embodiments are disclosed that allow the housing 2 of an electronic device to function as an input/output (I/O) device. In particular, the acoustic transducer 4 may sense user interactions with the external surface of the housing 2. The user interactions create a sound wave, which may be described as a pressure differential, in the housing 2 that is converted to an electrical signal by the acoustic transducer 4. The electrical signals generated by the acoustic transducer are interpreted as input to the electronic device. The electronic device may be configured to respond or provide an output accordingly.

Specifically, the acoustic transducer 4 may be coupled to a microprocessor 6 that processes and interprets the acoustic input of the housing 2. The microprocessor 6 may be configured to distinguish between different types of input as well as interpret the input as a particular type of input. In response, the processor 6 may generate an output signal.

In one embodiment, the acoustic transducer 4 may be configured to sense tapping, scratching, and other interactions with a surface of the housing 12. The transducer 4 generates electrical signals in response to the interactions. The electrical signals may be sent to a processor that interprets them as input to the electronic device. The interpretation maybe based on the type of input, nature of the input, the location of the contact on the housing 2, the amplitude of input, as well as other various other factors. For example, a scratch may be interpreted differently from a tap, and so forth. Additionally, a tap on the housing near an output or input device may actuate the device whereas a tap on another surface of the housing 2 may be interpreted as a keystroke.

Moreover, a vocabulary may be provided for the purpose of interpreting the electronic signals. As used herein, vocabulary may refer to recognizing input patterns as indicating a particular function. For example, in one embodiment, the vocabulary may allow for the device to interpret a pattern or series of taps and or scratches, etc., and/or other acoustic inputs as indicating particular functions, such as opening or closing an application, adjusting volume, etc., for example. The electronic device may provide an output or feedback upon receiving the input. In some contexts, however, interactions with the surface of the housing 2 may not be interpreted as input to the electronic device. For example, if the device determines that the contact is incidental, accidental or not recognized as input (i.e., not part of the vocabulary), no feedback or output may be provided.

Inputs from the acoustic transducer 4 may be used in addition to or in conjunction with other input sensors. For example, the housing 2 may also be configured with one or more sensors (not shown) capable of proximity sensing, touch sensing, pressure sensing, etc. Additionally, the input from the acoustic transducers may trigger or otherwise be used in conjunction with one or more output mechanisms to enhance a user's interface experience with the electronic device.

Specific embodiments are described in greater detail below with reference to the drawings and in the context of particular devices. However, the disclosed embodiments should not be interpreted or otherwise used to limit the scope of the disclosure, including the claims. Additionally, those skilled in the art will understand that the following description has broad application and various alternative embodiments and applications may extend from the described embodiments and fall within the scope of the disclosure. Thus, the discussion of any particular embodiment is intended as an example and is not meant to suggest that the scope of the disclosure, including the claims, is limited to these embodiments.

Figure 2A:
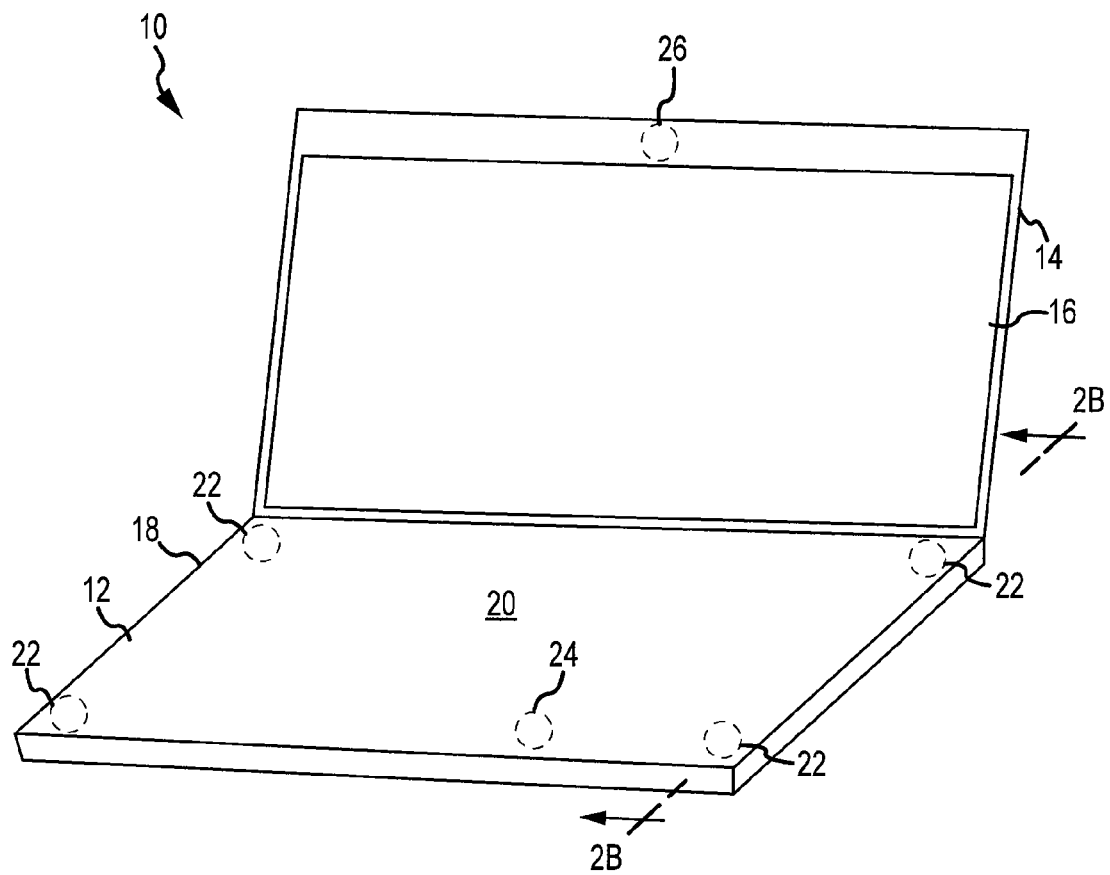
FIG. 2A illustrates a portable computing device with a housing configured as an input device by implementing acoustic transducers.

Turning again to the figures and referring to FIG. 2A, a portable computing device 10 is illustrated in accordance with an example embodiment. As illustrated, a housing 12 of the portable electronic device 10 may have a general clamshell form factor similar to a conventional notebook computer. In particular, the housing may include an upper portion 14 having a display 16 such as light emitting diode (LED) or organic LED configured to provide visual output to a user. A lower portion 18 is coupled by a hinge to the upper portion 14 of the housing 12. The housing 12 may be made of metal, plastic, glass, ceramic, composites or any other suitable material. With respect to metal, the housing may be made of aluminum, steel, titanium, or any other suitable metal or metal alloy.

As shown, the lower portion 18 includes a relatively flat surface 20 rather than a keyboard of a conventional notebook computer. The surface 20 is part of the housing 12 and is configured to act as an input for the portable computing device 10. In some embodiments, the surface 20 may have micro perforations that are not generally visible, but through which light may pass. In other embodiments, the surface 20 is solid. Additionally, in some embodiments, the surface 20 may be opaque and in other embodiments may be translucent or partially translucent to allow light to shine through the surface 20.

Multiple acoustic transducers 22 may be coupled to the housing 12 or otherwise located within the housing 12 underneath the surface 20. Any suitable acoustic transducer may be used, such as the Model 130A40 from PCB Piezotronics, for example. The acoustic transducers 22 may include microphones and/or speakers. Specifically, in the illustrated embodiment, microphones may be used to sense when a user taps, scratches, or otherwise touches surfaces of the device 10. One or more acoustic transducers may be used to detect sound and employ it as an input to the device. In the illustrated embodiment, multiple acoustic transducers 22 are provided to detect interactions with the surface 20. In particular, four acoustic transducers 22 are shown. In other embodiments, there may be more or fewer transducers 22 to perform a particular input function and/or to provide a higher level of precision. For example, in some embodiments there may be 3 or fewer acoustic transducers 22 and in other embodiments there may be an array of transducers 22.

The acoustic transducers 22 may be evenly distributed underneath the surface 20 or located in particular areas to provide particular functions. Although the transducers 22 are shown as being near the corners 24 of the housing, in other embodiments, the transducers 22 may be more centrally located. Further, in some embodiments, acoustic transducers 22 may be located on different walls or surfaces of the housing. As such, the housing may be configured to receive acoustic input on specific surfaces, specific areas, multiple surfaces, multiple areas, etc. based on the configuration of the housing and the acoustic transducers.

In some embodiments, the transducers 22 may be located only under an active portion of the surface 20. The active portion of the surface 20 may approximate the size of a standard keyboard, for example, and allow room for a user's palm to test on the surface 20 and/or allow room for additional buttons or spacing from the edges of the housing 12. In such an embodiment, the transducers 22 may be acoustically separated from inactive areas under the surface 20 by partitions (not shown). The partitions may be any acoustic insulator including foam material or plastic configured to dissipate and/or deaden sound waves.

Figure 2B:
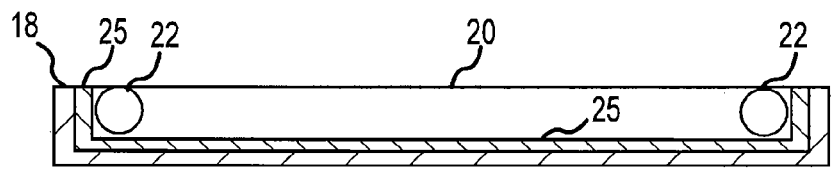
FIG. 2B is a cross section view of a portion of the portable computing device of claim 2B taken along a perimeter edge of the device.

Additionally, the perimeter of the housing 12 may be lined with acoustically dead material to reduce external interference as well as reducing interior echoes within the housing 12. FIG. 2B illustrates a cross sectional view of the lower portion 18 of the portable computing device 10 of FIG. 2A along a perimeter edge of the device 10. As can be seen, an acoustic insulator 25 is provided between parts of the housing 12 and the acoustic transducers 22. In some embodiments, no insulator 25 is provided between the surface 20 and the acoustic transducers 22, so that the transducers are particularly sensitive to interactions on the surface 20. Other techniques may also be employed to reduce effects that may interfere with the transducers 22 generating electrical signals that represent only interactions of a user on the surface 20. That is, techniques may be employed to help ensure that the transducers 22 generate signals representative of user input or to eliminate interference that may have entered into the generated signals.

The acoustic transducers 22 may enable the surface 20 of the housing 12 to function as an input device. In particular, in one embodiment, the acoustic transducers 22 may be configured to allow the surface 20 to function as a keyboard. Additionally, the surface 20 may operate as a trackpad, tracking device and/or a multi-touch user interface in some embodiments. Further, a single surface may provide multiple input functions. For example, a single surface may operate as both a keyboard or button and a trackpad. Continuing the example, the embodiment may sense a single, distinct tap on the surface and interpret it as a button press or keyboard input, while a more extended acoustic input (including one that changes its location along the surface) may be interpreted as an input for a touchpad or tracking device.

Various different types of input may be interpreted differently to achieve a particular functionality and may be interpreted by the device as a particular input. In particular, different inputs provide different waveforms that can be interpreted as a different input. In one embodiment, the material interacting with the surface 20 may provide a particular waveform and/or may interact with the housing's resonant frequency. For example, fingernails on the surface 20 may provide waveforms different from fingertips, a ring, a stylus, etc. the unique waveforms of various types of input may be interpreted as a particular type of input. As such, a fingernail or stylus may be interpreted as input to trackpad function, where as fingertip input may be interpreted as input to a keyboard function. In other embodiments, the rhythm, timing and/or motion of input can be used to interpret the type of input being provided. A calibration routine may be provided to allow a user to set how inputs to the device are interpreted. For example, the device may allow a user to correlate certain inputs and/or input types to certain functions. In one example, fingernail scratch diagonally across the surface may close an application, for example. Such configurable functionality may also be useful in implementing security for the device and/or applications or functions of the device 10. Additionally, the device 10 may be operable in different modes for interpretation of the types of input. For example, the device 10 (or certain surfaces of the device 10) may operate in a mode that only allow for interpretation of only certain types of input. In another mode, the device 10 (or certain surfaces of the device 10) may interpret all types of input.

To operate as a keyboard, a calibration may be performed based on the relative positions of the transducers 22, as the relative positions of the transducers may be used to determine where on the surface a user is striking. The determination of where a user strikes the surface 20 may be used to determine the keystrokes of the users. When a user strikes the surface 20 to perform a keystroke, each of the various transducers 22 that detect the strike may generate a signal. The time at which the generated signal is sensed by each transducer, as well as the relative magnitude of the signal may be used to determine the location where the surface 20 has been struck. The differences in time and/or magnitude may be used to triangulate the location of the input. For example, if a user were to strike near the front center of the surface 20 the front transducers 22 would first register the strike and generate a corresponding electrical signal and, subsequently, the two back transducers 22 would register the strike and generate a corresponding signal. If both of the front transducers 22 received the signal at approximately the same time it may be determined that the strike was near the center of the surface 20 and because the front transducers registered the strike before the back transducers it can be determined that the surface 20 was struck near the front portion of the surface 20. Accordingly, the embodiment typically uses at least three transducers, although 2 can be used if only one sensing axis is desired.

More specifically, the timing differential between when the various transducers 22 register the strike may be used to determine where the surface 20 was struck. Additionally, the timing differential may be used in conjunction with the relative magnitude of the signals generated by the transducers to determine the location. Generally, striking the surface of the housing will generate sound waves that travel from the location of the strike to the various transducers. In one embodiment, the transducers may be configured to receive the sound waves via the housing itself. In an embodiment where the housing is made of aluminum, for example, the speed of sound through aluminum is approximately 200 in/ms. In other embodiments, for example, the sound may travel through air to reach the transducers at the speed of approximately 13.5 in/ms. Because of the relative close proximity of the transducers 22, the time differential between when the various transducers 22 register the strike is generally a matter of microseconds or, at most, tens of milliseconds depending on where the strike occurs and through which medium the sound travels to the transducers.

Thresholds may be determined based upon specific transducer locations and maximum and minimum time differential thresholds for a sound wave to reach each transducer may be determined for each key of a keyboard. Specifically, treating the surface 20 as an x-y grid, maximum and minimum thresholds in the y direction and maximum and minimum thresholds in the x direction may be determined for locations corresponding to each key of a typical keyboard layout. Returning to the example of the strike near the front and center of the surface 20, if the time differential between when the front left transducer and the front right transducer register the strike is within the maximum and minimum thresholds in the x-axis it may be determined that the strike was near the middle of the surface 20. Further, a third transducer located in a position in the y-axis relative to the front left and right transducers may be used to locate the strike in the y-axis. Specifically, the time differential for the at least third transducer relative to at least one of the front transducers may be used to determine if the strike should be registered as a space bar keystroke based on maximum and minimum threshold in the y-axis for the space bar. If the strike is determined to be within the maximum and minimum thresholds in both the x- and y-axes, then the strike may be determined to be a space bar keystroke.

Referring again to FIG. 2A, one source of noise that may negatively impact the ability of the surface 20 of the housing 12 in combination with the acoustic transducers 22 to function as an input device may be component parts located within the housing 12. For example, a hard disk drive (not shown) may periodically or intermittently create an acoustic noise that may be detected by the transducers 22. For example, when the hard disk drive spins during a read or write operation, the noise generated by the spinning may be detected by the transducers and may interfere with accurate interpretation of user input by raising the noise level or inducing false signals into the electrical signals that are being interpreted. The operation of other devices may similarly result in increased noise levels, possibly interfering with the ability to accurately read and interpret user input. Two additional examples of noise generating devices include cooling fans and media readers, such a DVD and BluRay Disc players, although there may be many other noise sources.

To reduce the likelihood of noise interference, sound deadening barriers, such as partitions, may acoustically isolate the noise generating devices from the transducers 22 and/or isolate the transducers from the noise generating devices. In alternative embodiments an acoustic noise transducer 24 may be located within the housing 12 and configured to detect noise interior to the housing 12 (i.e., noise that is not due to interactions with the surface 20). The interior noise may be sensed by the transducers 22 and increase the noise level on the electrical signals generated by the transducers 22. Hence, the noise transducer 24 may generate an electrical signal that may be provided along with the signals generated by the other transducers 24 to a processor for filtering the interior noise. Specifically, the signal from the noise transducer 24 may be subtracted from the signals generated by the transducers 22 to remove any noise that may have originated from devices operating within the housing 12, or otherwise used to cancel or minimize the impact of such noise. Also, filtering based on 1) frequency band selection, 2) amplitude or thresholding and/or 3) signal pattern matching in time or frequency domain, can be used for distinguishing input signals from noise sources.

In another embodiment, an acoustic signature for the operation of the electronic device may be stored and used to clean or filter a signal generated by the transducers 22. Specifically, a waveform generated by operation of the electronic device 10 may be obtained by operating the device 10 in a variety of circumstances to determine how much acoustic noise is generated by the operation of the device 10. The waveform may be referred to as the acoustic signature of the device 10. The acoustic signature may be stored in a memory to be later compared with the signal generated by the transducers 22 during operation of the device 10. The elements or features of a waveform produced by the transducers 22, during operation of the device 10, that are the same as or similar to the acoustic signature of the device 10 may be filtered out. In some embodiments, an acoustic signature may be determined for each of the various noise generating devices within the housing 12, or for the most significant noise generating devices, and the acoustic signatures of each of the noise generating devices may be subtracted out of the signals generated by the transducers 22. One possible shortcoming of subtracting an acoustic signature is that the signature may not account for all possible operating conditions and/or abnormal operating conditions. Additionally, the acoustic signature typically does not present a real time representation of noise that may be detected by the transducers 22.

Noise interference from outside of the housing 12 may also interfere with the signal generated by the transducers 22. To counteract external noise interference, another acoustic noise transducer 26 may be located in the upper portion of the housing 12 and be configured to receive sound originating from outside of the housing 12. Many conventional notebook computers are configured with a microphone that may serve this purpose. Similar to the foregoing examples regarding internal noise, the noise originating from outside the housing maybe filtered from the signals generated by the transducers 22.

Figure 3:
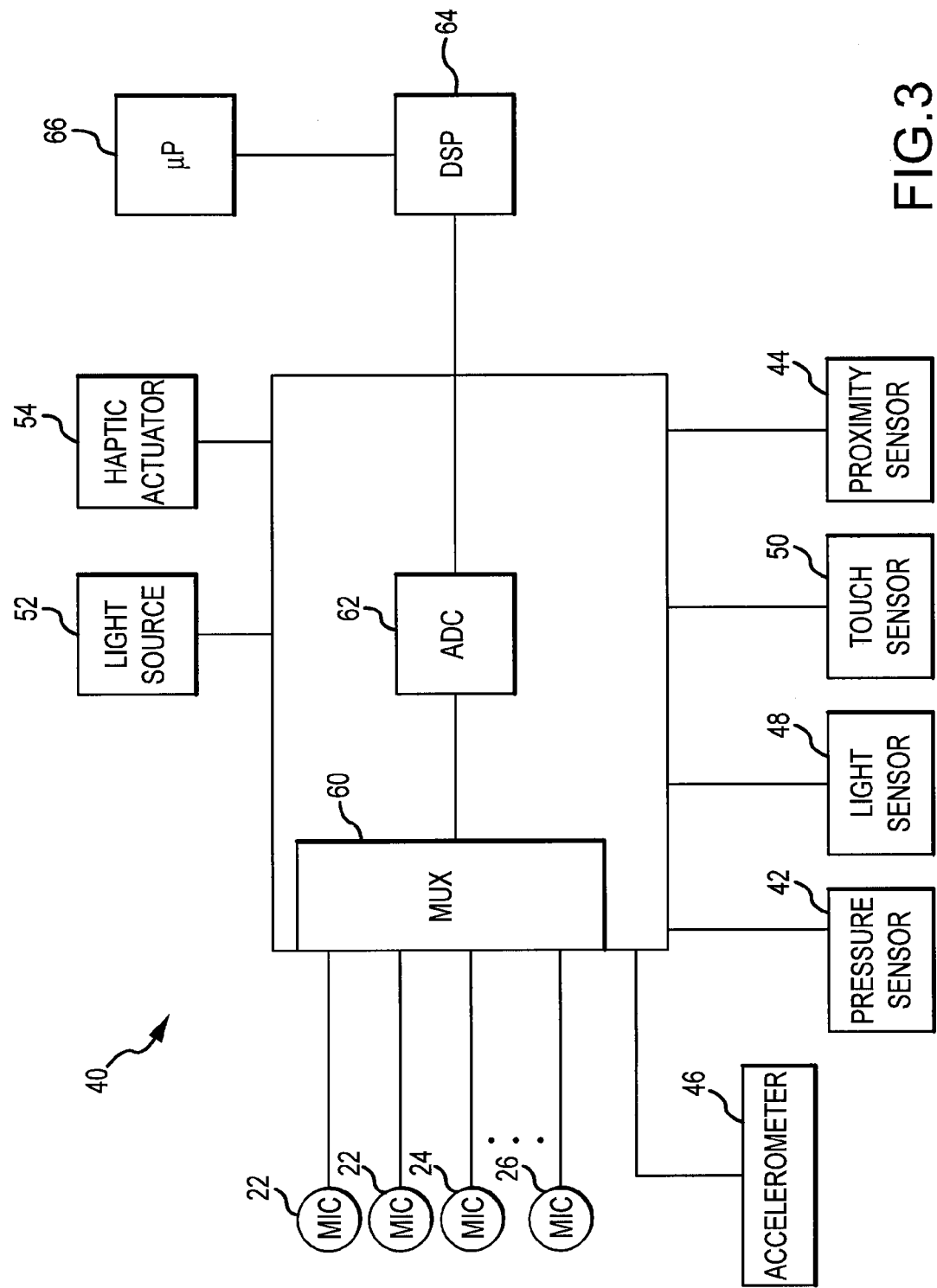
FIG. 3 is a simplified block diagram of an I/O system for operating the acoustic transducers and other sensors and actuators that may be integrated with the portable computing device illustrated in FIG. 2A.

As mentioned above, the acoustic transducers 22 may operate simultaneously with and/or in conjunction with other sensors, actuators and/or I/O devices. FIG. 3 illustrates a simplified block diagram of a system 40 that may be included in the device 10 to provide I/O functionality of the housing 12. In addition to the acoustic transducers 22, 24 and 26, a sample system 10 may include pressure sensors 42, proximity sensors 44, accelerometers 46, light sensors 48, touch sensors 50, light sources 52, haptic actuators 54, etc. The pressure sensors 42 may include capacitive sensors, strain gage sensors, piezoelectric sensors, resistive sensors, etc. and may be used to determine when a user presses or applies pressure on a surface of the device 10. The proximity sensors 44 may include ultrasonic sensors, photosensitive sensors, capacitive sensors, inductive sensors, etc. and are operated to determine when objects, such as users fingers and/or connectors are near the device 10 or a surface of the device 10. The light sources 52 may include light emitting diodes (LEDs), organic LEDs, incandescent light sources, etc. that are actuated to provide output to users. The haptic actuators 54 may include vibration, pulsing, mechanical, electricomechanical, electromagnetic, piezo, acoustic, thermal, pneumatic, microfluidic, etc. actuators that provide touch feedback to users. Data provided from the accelerometers 46 may be used in combination with input received from other sensors to determine conditions of use and may be used to configure content displayed on the device 10.

The electrical signals generated by the acoustic transducers 22, 24 and 26 may be processed through a multiplexer 60 and subsequently digitized by an analog to digital converter 62. It should be appreciated that signals from the other sensors may similarly be processed, but for the sake of simplicity only the acoustic transducers 22, 24 and 26 are shown as being coupled to the multiplexer 60 and analog to digital converter 62. Further, it should be understood that all signals may be subject to additional processing steps not shown such as amplification. Additional signal processing may be performed by a digital signal processor (DSP) 64 before the signal is passed to a microprocessor 66. In some embodiments, the microprocessor 66 may be a microcontroller unit ("controller") such as a model 8742 manufactured by Intel Corporation, or a PIC16F84 manufactured by Microchip, Inc. The microcontroller 66 may include hardware and/or software to control actuation and operation of multiple I/O sensors and actuators. Additionally, the controller 66 may be communicatively coupled to a CPU (not shown) of the device 10 or other component parts of the portable computing device 10.

The sensors and actuators may be positioned throughout the housing 12 and configured to enhance a user's experience of the device 10. In particular, the sensors and actuators may be configured to receive input from a user based on the user's interaction with the housing 12 and/or provide output to a user. For example, in one embodiment, proximity sensors 44 may be located in the housing 12 to detect when objects approach the surface 20. Upon detection of an object near the surface 20, the light sources 52 (which may be located under the surface 20 and be arranged in an array or other appropriate configuration) may be actuated to illuminate the surface 20. In particular, in one embodiment, the light sources 52 may illuminate the surface 20 to provide an appearance of keys of a keyboard. As mentioned above, the surface 20 may be made of a microperf material that allows light to pass through. Alternatively, the surface may be translucent or partially transparent. For example, the surface 20 may have an opaque grid with translucent areas in the interstitial regions of the grid. In one embodiment, the grid may approximate the shape of keys of a keyboard. Other embodiments, may include the actuation of haptic actuators 54 coupled to the surface 20 upon sensing of interactions with the surface 20 by the touch sensor 48, pressure sensor 42, etc.

Additionally, in some embodiments, the proximity sensor 44 (or other sensors, such as the touch or pressure sensors) may be used to activate the acoustic transducers and/or to provide a threshold to eliminate false positives detected by the acoustic transducers. For example, in one embodiment, the acoustic transducer 22 may only be activated when an object is in close proximity to the surface 20 as determined by the proximity sensor 44. In another embodiment, another sensor, such as a touch or pressure sensor, for example, may be used to actuate the acoustic transducers 22. Further, in another embodiment, the acoustic transducers 22 may be activated only when an object determined by the processor to be a hand (or finger) based on electrical signals generated by the proximity sensor 44. Additionally or alternatively, in one embodiment, electrical signals generated by the acoustic transducers 22 may be discounted or filtered when the proximity sensors 44 (or other sensors, such as touch or pressure sensors) do not indicate the presence of an object near the surface 20. For example, if the device is sitting on a table and an object is dropped on the table creating a loud noise, the acoustic transducers 22 may register an input (i.e. generate an electrical signal), however, there was no input to the device intended by the dropping of an object on the table. In this instance, the electrical signals generated by the acoustic transducers 22 may be filtered out and no output or feedback provided by the device. Hence, the proximity sensor 44 and/or other sensors may be used as a threshold to eliminate false positives and to activate the acoustic transducers 22.

Figure 4:
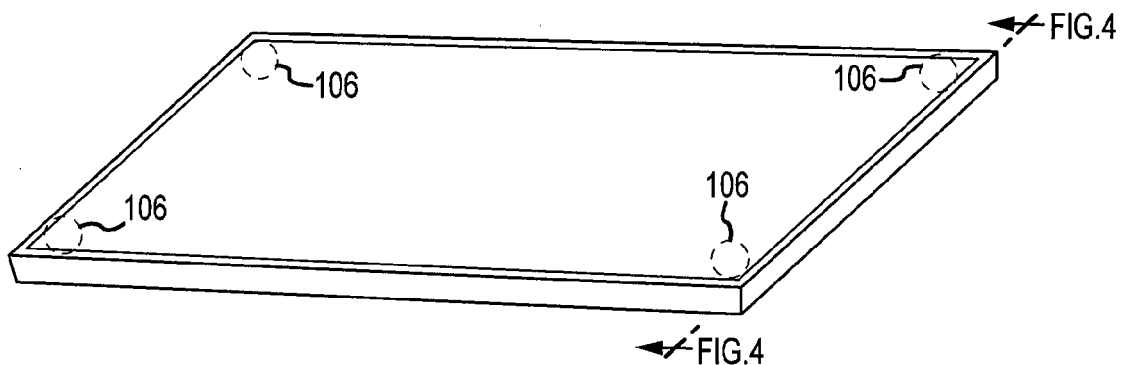
FIG. 4 illustrates a portable computing device in accordance with an alternative embodiment.

As mentioned above, the surface 20 or portions of the surface 20 may be used as a trackpad or multi-touch surface. In such embodiments, a tap may be interpreted as a selection of content displayed on the display 14 and which a cursor is overlaid, rather than a keystroke. Turning to FIG. 4, a portable computing device 100 (such as a handheld tablet or touch screen mobile device) is illustrated that may utilize a variety of sensors in its housing 102 to provide input and output functionality and for which the trackpad and multi-touch functionality may be particularly useful. In some embodiments, the device 100 may be a tablet computing device and in other embodiments the device 100 may a personal digital assistant, smart phone, media player or other similar device where a display, such as the display 104 of the device 100, is also used as the primary source of user input.

Figure 5:
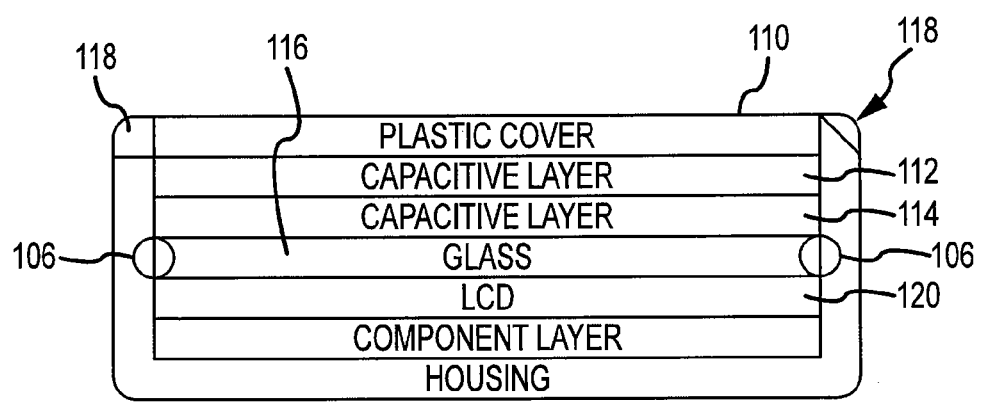
FIG. 5 is a cross-sectional view of the portable computing device of FIG. 4.

The device 100 may include a wide variety of functionality including, but not limited to: wireless communication including cellular phone, Wi-Fi, Bluetooth, and so on; media playback (audio and video), still and video image capture; audio capture; and user application operation including word processing, for example. Additionally, as with the above described embodiments, the housing 102 may include one or more sensors and one or more actuators to achieve a desired input/output functionality. In one embodiment, the housing 102 may include one or more acoustic transducers 106. FIG. 5 is a cross-sectional view taken along the right hand side of the device 100 illustrated in FIG. 4 and shows various layers of the device housing 102. In particular, as can be seen, the top surface 110 may be a plastic layer. The next two layers 112 and 114 may form a capacitive sensor followed by a glass layer 116. The acoustic transducers 106 may be located in the same layer as the glass layer 116 in one embodiment and optionally obscured by a bezel 118. In other embodiments, the acoustic transducers 106 may be located above or below the glass layer 116. An LCD 120 may be located under the glass layer 116 other component parts 122 of the device 100 may be located under the LCD 120 and the housing 102 provides the backing of the device 102.

The acoustic transducers 106 may be configured to sense user interaction with any external surface, including the housing 102 and the top surface 110. The device 100 may interpret sensed events as input to the device 100. For example, the acoustic transducers 106 may detect a tap on the housing 104 and the tap may be interpreted by the device 100 to turn on or turn off the device 100, to stop a certain action, and/or to select content displayed on the display 102. In one embodiment, for example, if the device 100 is audibly ringing to indicate an incoming phone call, a simple tap to the housing 102 may cease the audible ringing.

Additionally, dragging a finger, stylus, or other object across the housing 102 and/or the surface 110 of the display 104 may be sensed using acoustic transducers 106 to receive the input. The dragging motion can be distinguished from a tap as it will be continuous and have different profile. Specifically, the tap will generate a pulse signal, whereas the dragging will appear as a continuous signal. Location and direction of movement on the surface 110 or the housing 102 may be determined based on the relative timing that the transducers register the sound. That is, as a finger moves closer to one transducer 106 it registers the sound more quickly relative to another transducer from which the finger is moving away. As previously discussed, the timing differential between when different transducers 106 register the sound is thus used to determine location and direction of movement.

The location and direction of the movement may be used to define an input signal that is interpreted according to a vocabulary stored in a memory of the device 100. The vocabulary may include certain motions, actions and patterns that may be interpreted by the device 100 as input from the user to perform a particular function. For example, dragging a finger in an upwards direction across the back of the housing 102 may increase the volume of output by a speaker (not shown) of the device or of headphones (not shown) coupled to the device. In another embodiment, dragging a finger across the surface 110 may drag and drop content, such as icons, displayed by the device 100. In yet another embodiment, movement in a particular pattern across the housing 102 may lock and/or unlock the device 100. For example, dragging a finger to "draw" a circle in a clockwise pattern may unlock the device 100. Additionally, taps and or other interactions with the housing 102 or surface 110 may be interpreted to actuate or turn off devices located near where the user interacted with the surface 110 or housing 102. For example, if a tap is detected on the housing 102 near where a camera is located, the camera may be turned on or off.

A variety of other input may be defined in the vocabulary to describe a particular input and provide a specific output or response. For example, tapping the speakers may mute or unmute any audio being played. In another example, tapping the speakers once may toggle play and pause, tapping the speakers twice may skip to the next track and tapping the speakers three times may skip to the previous track. In still yet another example, making a circular gesture on the surface may adjust the audio volume (i.e., clockwise gesture for increasing volume and counterclockwise gesture to decrease volume.) Further, in yet another example, tapping the display housing may wake up the display (or the entire device) from a sleep state. It should be understood that many other acoustic inputs may be defined by the vocabulary in addition to or instead of the foregoing examples.

Figure 6:
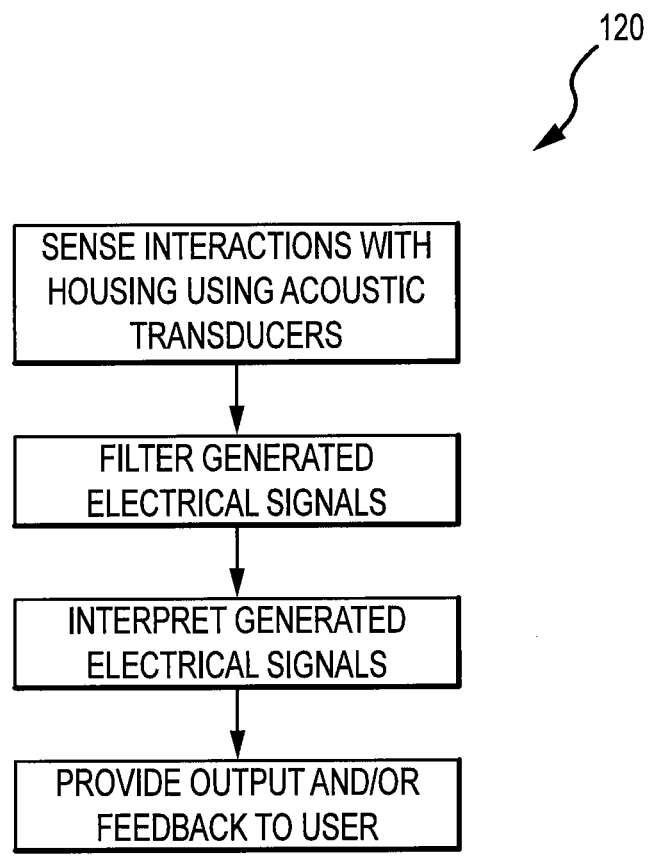
FIG. 6 is a flowchart illustrating a method for using a housing of an electronic device as an input device using acoustic transducers.

FIG. 6 is a flowchart illustrating a method 120 for implementing acoustic transducers in combination with a housing of an electronic device as an input device. The method 120 includes using the acoustic transducers to sense interactions with a surface of the housing, as indicated at block 122. The interactions may include tapping, dragging a finger across the surface, etc. The acoustic transducers generate an electrical signal corresponding to the sensed sound created by the surface interaction. The electrical signals generated by the acoustic transducers are filtered, as indicated at block 124. The filtering may include real-time sensing of noise using internal and/or external acoustic noise transducers, as discussed above. Additionally or alternatively, the generated signals may be filtered using acoustic profiles. Once filtered, the signals may be interpreted, as indicated at block 126. The interpretation of the signals may include determining the type of interaction (i.e. tapping, scratching, etc.), the location on the housing of the interaction, as well as directional information if movement was involved. Additionally, the translation may include determining an appropriate output and/or response to the input, as indicated at block 128. For example, the device may be turned on or off, a keystroke may be registered, etc.

It should be understood that in some embodiments, different sensors and actuators, as well as different combinations of sensors and actuators may be implemented to achieve a desired effect. Although various specific embodiments have been described above, it should be appreciated that aspects of the various embodiments may be combined into a single device to provide a desired functionality.

The invention claimed is:

1. An electronic device comprising:
    a housing;
    one or more acoustic transducers positioned within the housing, each operative to generate an electrical signal in response to detecting sound resulting from an impact with the housing;
    a microprocessor coupled to the one or more acoustic transducers and configured to receive the electrical signals generated by the one or more acoustic transducers, the microprocessor operative to interpret a generated electrical signal as input to the electronic device;
    a digital signal processor coupled to the microprocessor and configured to process the generated electrical signals; and
    one or more additional acoustic transducers configured to sense noise, the digital signal processor using the sensed noise to filter the generated electrical signals.

2. The electronic device of claim 1 wherein the one or more additional acoustic transducers are configured to sense noise generated internal to the housing.

3. The electronic device of claim 1 wherein the one or more additional acoustic transducers are configured to sense noise generated external to the housing.

4. The electronic device of claim 1 wherein the digital signal processor is configured to filter the generated electrical signals using a noise profile of the device stored in a memory of the device.

5. The electronic device of claim 1 further comprising at least one of a pressure sensor, a touch sensor, a light sensor, a proximity sensor or an accelerometer coupled to the microprocessor and configured to operate simultaneously with the one or more acoustic transducers.

6. The electronic device of claim 1 comprising a memory coupled to the microprocessor, the memory storing a noise profile for the device, the noise profile being filtered out of the electrical signals generated by the acoustic transducers.

7. The electronic device of claim 1 further comprising at least one of a light source or a haptic actuator coupled to the microprocessor and configured to operate in conjunction with the one or more acoustic transducers to provide output.

8. The electronic device of claim 1 further comprising a display configured to display output content, wherein the one or more acoustic transducers are configured to sense interactions on the display.

9. The electronic device of claim 1 wherein the housing comprises at least one acoustically isolating member located internal to the housing.

10. The electronic device of claim 9 wherein the at least one acoustically isolating member comprises a partition or a foam member.

11. A method of manufacturing an electronic device implementing acoustic transducers with a housing of the electronic device to sense input, the method comprising:
    configuring one or more acoustic transducers located within a housing to generate an electrical signal in response to detecting a sound on the housing;
    coupling the one or more acoustic transducers to a microprocessor;
    programming the microprocessor to interpret electrical signals generated by the one or more acoustic transducers as input, wherein the interpretation includes determining the origin of acoustic interactions based on a timing differential between the generated electrical signals;
    generating a noise profile for the electronic device;
    storing the noise profile on a memory of the electronic device; and
    providing a digital signal processor configured to filter the generated electrical signals with the noise profile by modifying the generated electrical signals.

12. The method of claim 11 further comprising:
    providing at least one acoustic noise transducer within the housing;
    configuring the at least one acoustic noise transducer to sense sounds originating from outside the housing;
    coupling a digital signal processor to the at least one acoustic noise transducer and the microprocessor; and
    programming the digital signal processor to filter the electrical signals generated by the one or more acoustic transducers with electrical signals generated by the at least one noise transducer.

13. A method of manufacturing an electronic device implementing acoustic transducers with a housing of the electronic device to sense input, the method comprising:
    configuring one or more acoustic transducers located within a housing to generate an electrical signal in response to detecting a sound on the housing;
    coupling the one or more acoustic transducers to a microprocessor;
    programming the microprocessor to interpret electrical signals generated by the one or more acoustic transducers as input, wherein the interpretation includes determining the origin of acoustic interactions based on a timing differential between the generated electrical signals;
    coupling at least one proximity sensor within the housing to the microprocessor;
    configuring the at least one proximity sensor to generate electrical signals when objects are proximately located to the housing; and
    programming the device to actuate the acoustic transducers upon receiving an electrical signal from the at least one proximity sensor.

14. The method of claim 11 further comprising:
    providing at least one of a light source or a haptic actuator within the housing; and
    configuring the microprocessor to operate the at least one of the light source or the haptic actuator in response to interpreting the generated electrical signals as input.

15. An electronic device comprising:
    a panel having an external surface and an internal surface;
    a plurality of acoustic transducers positioned in the housing proximate to the internal surface, the plurality of acoustic transducers being distributed under the panel;
    a microprocessor coupled to the plurality of acoustic transducers, the plurality of acoustic transducers configured to generate electrical signals correlative to sounds originating on the external surface, the microprocessor being configured to interpret the electrical signals as input to the device;

one or more output devices configured to provide an output in response to the input;

one or more additional acoustic noise transducers configured to sense noise interference; and a digital signal processor coupled to the plurality of additional acoustic transducers, the digital signal processor filtering the generated electrical signals of the one or more acoustic transducers with noise signals sensed by the one or more additional acoustic noise transducers.

16. The electronic device of claim 15 wherein the one or more output devices comprises at least one light source configured to be seen through a microperforation in the external surface.

17. The electronic device of claim 15 comprising:

at least one additional sensor comprising a pressure sensor, a touch sensor, a light sensor, a proximity sensor or an accelerometer, the at least one additional sensor being coupled to the microprocessor and configured to provide input to the device; and at least one of a haptic actuator, light source or acoustic transducer, wherein the at least one of the haptic actuator, light source or acoustic transducer is configured to provide output in response to the input from the at least one additional sensor.

\* \* \* \* \*